Patented Jan. 9, 1951

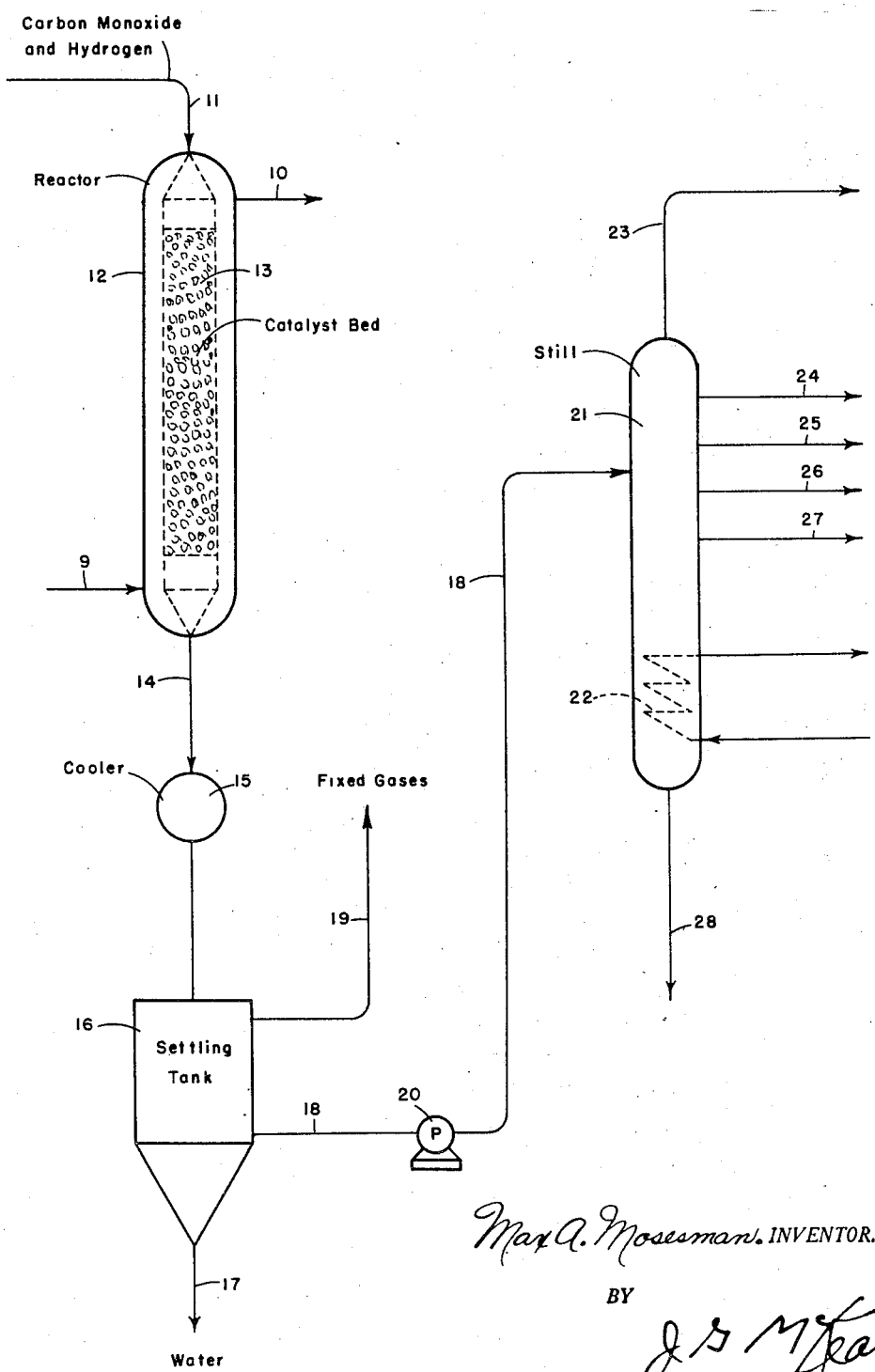

2,537,688

UNITED STATES PATENT OFFICE 2,537,688

METHOD FOR SYNTHESIZING HYDROCARBONS AND OXYGENATED COMPOUNDS

Max A. Mosesman, Baytown, Tex., assignor, by mesne assignments, to Standard Oil Development Company, Elizabeth, N. J., a corporation of Delaware Application December 20, 1946, Serial No. 717,587

15 Claims. (Cl. 260—449.6)

The present invention is directed to an improved method for effecting the synthesis of hydrocarbons and oxygenated organic compounds from carbon monoxide and hydrogen.

It is well known to the art to produce hydrocarbons by the reaction of carbon monoxide and hydrogen in the presence of a catalyst and under well defined conditions of temperature, pressure, and contact time, these conditions being adjusted for the particular type of catalyst being employed. The products obtained by the reaction of carbon monoxide and hydrogen also vary in type, configuration, and molecular weight depending upon the type of catalyst employed. Paraffinic and olefinic hydrocarbons are the usual products obtained in a reaction of this type; by-products consist chiefly of water, oxygenated compounds and carbon monoxide. Experience has shown that the oxygenated compounds are predominantly alcoholic in nature and that small amounts of esters, organic acids, ketones and aldehydes are usually also formed.

Workers in the prior art have disclosed processes for hydrogenating carbon monoxide to produce hydrocarbons using catalysts such as sintered iron promoted with an alkali metal compound and reduced in a hydrogen atmosphere, or by the reduction or oxidation of iron or of metals of the iron group in mixtures of hydrogen and steam. The structure of the several iron oxides is well known from the results of X-ray diffraction examinations. The prior art workers have also employed as catalysts for the Fischer synthesis process reduced $Fe_3O_4$ or reduced alpha ferric oxide; these catalysts were prepared by reducing promoted $Fe_3O_4$ crystals directly or by reducing alpha $Fe_2O_3$ crystals.

In accordance with the present invention, carbon monoxide and hydrogen are brought into contact with an iron oxide type catalyst under suitable temperatures and pressures to produce high yields of hydrocarbons as well as oxygenated organic compounds. The iron oxides employed as a catalyst in accordance with the present invention may be selected from the class of compounds illustrated by alpha or gamma ferric oxide or ferro-ferric oxide to which has been added a substantial amount of an alkali metal ferrate such as potassium ferrate, $K_2FeO_4$. The mixture of iron oxide and alkali metal ferrate is then milled preferably in the presence of a small amount of ethyl alcohol and dried at a temperature of about 230° F. and then pilled. The pilled material is then heated at superatmospheric temperatures in the presence of air to obtain an active catalyst containing a substantial quantity of alkali metal ferrate. The oxidized material is then subjected to a reducing atmosphere at superatmospheric temperatures before it is employed as a catalytic agent.

Accordingly, the present invention may be described briefly as involving the contacting of a mixture of hydrogen and carbon monoxide with a catalyst which is obtained by subjecting to a reducing atmosphere at superatmospheric temperatures a major amount of iron oxide and a minor amount of alkali metal ferrate with the feed gases being maintained under temperature and pressure conditions to cause the formation of substantial amounts of hydrocarbons and oxygenated hydrocarbons.

It is preferred to contact the mixture of hydrogen and carbon monoxide with the catalyst at a temperature in the range of 450° to 675° F. and at a pressure within the range of 100 to 500 pounds per square inch gauge. It is also desirable for the hydrogen and carbon monoxide to be present in ratios within the range of 2:1 to 1:1 and to use feed rates within the range of 100 to 1500 volumes of feed per volume of catalyst per hour.

The catalytic mass comprising the reduced mixture of iron oxide and alkali metal ferrate may be formed in any convenient manner and employed in the practice of the present invention. As one method for producing the catalytic mass, iron oxide in the form of ferro-ferric oxide or alpha or gamma iron oxide may be admixed with a minor amount of dry alkali metal ferrate such as potassium ferrate and a small amount of alcohol for adequate mixing. Usually from 0.2 to 20% of potassium ferrate, based on the iron oxide, will be suitable. The resultant paste containing iron oxide, potassium ferrate, and alcohol may be dried and then heated in the presence of a free oxygen-containing atmosphere at a temperature of about 1000° F., and the resulting mass then reduced with hydrogen gas at a temperature in the range of 700° to 1600° F.

As another method of preparing a catalytic mass comprising iron oxide and potassium ferrate, a mixture of iron filings and potassium nitrate may be ignited on an iron surface and the ignited mixture washed with alcohol, dried, and added to the iron oxide catalyst which then may be ball milled in the presence of alcohol, dried and pilled. After the drying and pilling operations, the pills are heated in a free oxygen-containing atmosphere at a temperature of about 1000° F. and the resultant mass then reduced with hydrogen gas at a temperature within the range of 700° to 1600° F. prior to employment as a catalyst in the synthesis of hydrocarbons.

The practice of the present invention may now be described by reference to the drawing which is a single figure in the form of a flow diagram showing a mode of practicing one embodiment thereof.

Turning now specifically to the drawing, a mixture of carbon monoxide and hydrogen at the pressure desired for the synthesis reaction is passed through an inlet line represented by the numeral 11 into reactor 12. Within reactor 12 is arranged a catalyst mass 13 which has been prepared by the reduction of a mixture of iron oxide and potassium ferrate. Since the reaction of carbon monoxide and hydrogen is exothermic, tremendous amounts of heat are evolved during the reaction and must be removed from the catalyst bed 13. In order to maintain the temperature of the catalyst bed within the limits required for optimum conversion, a space is provided between reactor bed 13 and vessel 12 and a suitable fluid is passed into the space by inlet line 9 and withdrawn through outlet 10 for controlling the temperature of the catalyst bed.

The effluent from the catalyst bed 13 containing unreacted carbon monoxide and hydrogen, hydrocarbons and oxygenated compounds such as alcohols, carbon dioxide and water is removed through line 14 and passes through a cooling means 15 wherein the major portion of hydrocarbons and water are liquefied. The mixture is withdrawn from cooling means 15 and discharged into a settling means 16 where the total mixture is separated into a hydrocarbon phase and a water phase. Water is withdrawn continuously from settler 16 through the line 17 and the hydrocarbon layer is withdrawn continuously through line 18. Non-condensible materials contained in the effluent may be withdrawn from the top of settling means 16 through line 19; these exit gases may be conducted to a separation means, not shown, in order to recover unreacted carbon monoxide and hydrocarbon for recycling to the reactor 12 or may be recycled to the reactor as such.

The liquid hydrocarbon layer is passed through line 18 containing pump 20 and discharged into a distilling means 21, heat being supplied by heating coils 22 to heat the hydrocarbons therein. Hydrocarbon fractions suitable for use as motor fuels, Diesel fuel or components of lubricating oils may be withdrawn from distilling means 21 through lines 23, 24, 25, 26 and 27. A heavy bottoms fraction is withdrawn through line 28 and may be employed as a lubricating oil or as a fuel oil.

It will be recognized by those skilled in the art that the hydrocarbons withdrawn from distillation unit 21 may be employed for many purposes. For example, light olefins, boiling in the range of $C_4$ and $C_5$ hydrocarbons, may be alkylated with an isoparaffin, such as isobutane, in the presence of a suitable catalyst to produce a high octane motor fuel. Also, the liquid fractions obtained in the synthesis process may be hydrogenated to improve the stability and octane characteristics thereof. It is to be pointed out that it may be desirable to recover oxygenated organic compounds from both the water and hydrocarbon phases removed from settler 16; the more water-soluble oxygenated hydrocarbons will be present in the water phase whereas the high molecular weight oxygenated compounds which are relatively insoluble in water will be present in the hydrocarbon phase.

While the above discussion has described a method for carrying out the synthesis reaction in the presence of catalysts employing a fixed bed operation, it is to be pointed out that other methods for carrying out the aforesaid synthesis reaction may at times be desirable. For example, the catalyst may be employed in the form of a suspension in a gaseous stream and passed through the reaction zone. The technique for carrying out reactions in a suspension of catalyst, commonly designated as a fluidized catalyst, is well known and, accordingly, the details of such an operation will not here be given. The catalyst employed in the process of my invention lends itself well to use either in the form of pellets or pills for the fixed bed type of operation or to use as a finely divided powder suspended in a gaseous stream in the fluid catalytic synthesis operation.

The practice of the present invention will be further illustrated by the following example:

To an aqueous solution containing 340 parts by weight of $Fe(NO_3)_3 \cdot 9H_2O$ is added 90 parts by weight of $NH_4OH$. The precipitated $Fe(OH)_3$ is filtered dry and then slurried with about 50 parts by weight of distilled water. To the slurry is added 50 parts by weight of solid KOH and while the suspension is maintained at a temperature below 140° F., 50 parts by weight of liquid bromine and solid KOH are added. During this addition, the materials are added gradually with continual stirring. Sufficient solid KOH is added to the reaction mixture so that the latter is completely saturated with respect to the alkali. At this point, it is preferable to add an excess of solid KOH to the mixture, for example 20 parts by weight of excess alkali, before heating the mixture with stirring at a temperature of 140° F. for approximately one-half hour.

The heated mixture is allowed to cool and the top layer comprising potassium ferrate is decanted from the total mixture and dried under partial vacuum. Alkaline material remaining in the dried potassium ferrate may be removed by successive washings and decantations with alcohol. The potassium ferrate is then redried under vacuum and, as produced in this manner, is substantially free from alkaline contaminants and contains minor portions of potassium bromate and bromide as illustrated by the following analysis:

| | Percent |
|---|---|
| $K_2FeO_4$ | 75.0 |
| KBr | 20.0 |
| $KBrO_3$ | 5.0 |

To 100 parts by weight of ferro-ferric oxide in finely divided form is added sufficient of the above preparation to give a catalyst comprising 5 parts by weight of dried potassium ferrate and a small amount of alcohol to permit adequate milling. The mixture is then mixed thoroughly for about 4 hours by ball milling, dried at about 230° F. and pilled to a size desired for subsequent use in the synthesis process. The pilled material is then heated in free excess air at about 1000° F. for about 4 hours and allowed to cool.

The beneficial results to be obtained by using the above-prepared catalyst, containing 5 parts by weight of potassium ferrate per 100 parts by weight of ferro-ferric oxide, in the hydrogenation of carbon monoxide are exemplified by the following description and data:

The catalyst prepared in accordance with the above procedure is placed in a reaction chamber and reduced in the presence of hydrogen for 24 hours at a temperature of 700° F. and atmospheric pressure. The hydrogen is passed over the catalyst at a rate of 1000 volumes of hydrogen per volume of catalyst per hour. A synthesis gas mixture comprising one part of hydrogen per part of carbon monoxide is then passed over the catalyst at a pressure of 150 pounds per square inch gauge, a temperature of 575° F., and a rate of 200 volumes per volume of catalyst per hour.

The advantages of the practice of my invention will be illustrated by the following data obtained in the foregoing run which lasted for 1736 hours, the numerical values in each column of the table representing the low and high figures for the period indicated:

TABLE I

| | | | | | | | |
|---|---|---|---|---|---|---|---|
| Temperature, °F | 550 | 575 | | 575 | | 575 | 585 |
| Pressure, p. s. i. g | 150 | 150 | | 150 | | 150 | 200 |
| Feed Rate, V./V./Hr | 200 | 200 | | 200 | | 200 | |
| $H_2/CO$ Ratio (Charge) | 1.305 | 0.98–1.305 | 1.02–1.03 | 1.068–1.11 | 1.03–1.05 | 0.92–1.0 | 0.956–0.96 |
| Hours on Stream | 4–28 | 28–196 | 196–244 | 244–316 | 316–436 | 436–556 | 556–676 |
| CO Conversion, Mol Per Cent | 97.9 | 97.0–97.2 | 96.9–97.5 | 96.3–97.9 | 94.4–97.0 | 91.0–97.2 | 80.5–87.8 |
| $H_2$+CO Conversion, Mol Per Cent | 79.1 | 85.8–85.9 | 88.3–89.6 | 80.3–82.4 | 78.5–86.8 | 75.4–86.7 | 71.5–87.9 |
| Output Yields, cc./$M^3$ of $H_2$+CO Cons.: | | | | | | | |
|   $C_4$+Hydrocarbon | 164 | 241–243 | 214–232 | 204–247 | 214–268 | 211–226 | 177–265 |
|   Water | 54 | 44–47 | 12–35 | 46–50 | 23–59 | 39–48 | 33–36 |
| Hydrocarbon Test Data:[1] | | | | | | | |
|   Specific Gravity | 0.7484 | 0.7424–0.7580 | 0.7720 | 0.7720 | 0.7626 | 0.7727 | 0.8000 |
|   Bromine Number | 53.5 | 54.5–90.6 | 63.0 | 63.0 | 69.7 | 66.6 | 64.4 |
|   Alpha Olefin [2] | | 51.1–61.6 | 50.2 | 50.2 | 57.5 | 55.9 | 45.8 |
|   Beta Olefin [2] | | 21.5–25.9 | 33 | 22.9 | 20.9 | 21.5 | 25.1 |
|   Alpha/Beta Olefin Ratio | | 2.3–2.85 | 2.47 | 2.47 | 2.75 | 2.60 | 1.82 |
|   Alcohol, Wt. Per Cent $C_5H_{11}OH$ | | 3.4–7.4 | 1.65 | 1.65 | 1.21 | 1.54 | 6.44 |
|   Carbonyl, Wt. Per Cent $(C_2H_5)_2CO$ | 0.78 | 1.42–2.44 | | | 1.63 | 1.96 | 2.46 |
|   Acid, Wt. Per Cent $C_4H_9COOH$ | 0.66 | 0.97–1.74 | | | 1.36 | 1.00 | 1.57 |
| Water Test Data: | | | | | | | |
|   Alcohol, Wt. Per Cent $C_2H_5OH$ | 13.5 | 9.6–11.5 | | | | | 13.1 |
|   Carbonyl, Wt. Per Cent $(CH_3)_2CO$ | 0.50 | 0.64–1.08 | | | | | 1.53 |
|   Acids, Wt. Per Cent $CH_3COOH$ | 0.12 | 0.06–0.30 | | | | | 0.15 |

[1] Based on recovered liquid product.
[2] Calculated as bromine number based on olefin type determination by infrared absorption, uncorrected for oxygenated compound interference.

| | | | | | | | |
|---|---|---|---|---|---|---|---|
| Temperature, °F | 585 | | 600 | | 600 | | |
| Pressure, p. s. i. g | | 150 | | | 150 | | |
| Feed Rate, V./V./Hr | | 200 | | | 200 | | |
| $H_2/CO$ Ratio (Charge) | 0.94 | 0.94 | 0.923–1.03 | 0.96 | 0.771–0.99 | | Reduced with $H_2$ at 700° F. for 24 Hours at 1000 V./V./Hr. and 0 p. s. i. g. |
| Hours on Stream | 676–700 | 700–806 | 806–902 | 902–926 | 926–1070 | 1070–1088 | |
| CO Conversion, Mol Percent | 79.5 | 82.5 | 83.5–90.2 | 75.7 | 82.5–91.9 | | |
| $H_2$+CO Conversion, Mol Percent | 71.8 | 73.2 | 83.5–90.2 | 62.8 | 70.6–81.9 | | |
| Output Yields, cc./$M^3$ of $H_2$+CO Cons.: | | | | | | | |
|   $C_4$+Hydrocarbon | 195 | 223 | 191–231 | 288 | 188–223 | | |
|   Water | 107 | 28 | 29–37 | 37 | 27–50 | | |
| Hydrocarbon Test Data:[1] | | | | | | | |
|   Specific Gravity | 0.7870 | | 0.7711 | 0.7711 | 0.7719 | | |
|   Bromine Number | 58.1 | | 62.8 | 62.8 | 70.2 | | |
|   Alpha Olefin [2] | 47.0 | | 50.9 | 50.9 | | | |
|   Beta Olefin [2] | 27.4 | | 26.1 | 26.1 | | | |
|   Alpha/Beta Olefin Ratio | 1.71 | | 1.94 | 1.94 | | | |
|   Alcohol, Wt. Percent $C_5H_{11}OH$ | 7.48 | | 4.84 | 4.84 | | | |
|   Carbonyl, Wt. Percent $(C_2H_5)_2CO$ | 2.69 | | 2.11 | 2.11 | 3.43 | | |
|   Acid, Wt. Percent $C_4H_9COOH$ | 1.34 | | 2.28 | 2.28 | 2.32 | | |
| Water Test Data: | | | | | | | |
|   Alcohol, Wt. Percent $C_2H_5OH$ | 13.3 | | 11.4 | | 10.5 | | |
|   Carbonyl, Wt. Percent $(CH_3)_2CO$ | 0.76 | | 1.2 | | 0.88 | | |
|   Acids, Wt. Percent $CH_3COOH$ | 0.30 | | 0.2 | | 0.30 | | |

[1] Based on recovered liquid product.
[2] Calculated as bromine number based on olefin type determination by infrared absorption, uncorrected for oxygenated compound interference.

| | | | | | | | |
|---|---|---|---|---|---|---|---|
| Temperature, °F | | | 600 | | | 600 | |
| Pressure, p. s. i. g | | | 150 | | | 150 | |
| Feed Rate, V./V./Hr | | | 200 | | | 200 | |
| $H_2/CO$ Ratio (Charge) | 1.053 | 1.068–1.11 | 0.673 | | 0.861–1.163 | | Reduced with $H_2$ at 700° F. for 24 Hours at 1000 V./V./Hr and 0 p. s. i. g. |
| Hours on Stream | 1088–1112 | 1112–1232 | 1232–1280 | 1280–1352 | 1352–1472 | 1472–1520 | |
| CO Conversion, Mol Per Cent | 99.4 | 95.2–97.4 | 94.0 | | 89.8–90.1 | | |
| $H_2$+CO Conversion, Mol Per Cent | 86.9 | 78.7–87.9 | 88.8 | | 73.1–79.9 | | |
| Output Yields, cc./$M^3$ of $H_2$+CO Cons.: | | | | | | | |
|   $C_4$+Hydrocarbon | 124 | 198–222 | 203 | | 171–205 | | |
|   Water | 53 | 59–81 | 13 | | 30–60 | | |
| Hydrocarbon Test Data:[1] | | | | | | | |
|   Specific Gravity | 0.8375 | 0.8002 | 0.7630 | 0.7630 | 0.7680 | | |
|   Bromine Number | | 51.6 | 73.0 | 73.0 | 66 | | |
|   Alpha Olefin [2] | | | | | | | |
|   Beta Olefin [2] | | | | | | | |
|   Alpha/Beta Olefin Ratio | | | | | | | |
|   Alcohol, Wt. Per Cent $C_5H_{11}OH$ | | | | | | | |
|   Carbonyl, Wt. Per Cent $(C_2H_5)_2CO$ | | 2.09 | 2.65 | 2.65 | 2.7 | | |
|   Acid, Wt. Per Cent $C_4H_9COOH$ | | 0.89 | 0.89 | 0.89 | 1.2 | | |
| Water Test Data: | | | | | | | |
|   Alcohol, Wt. Per Cent $C_2H_5OH$ | | 5.3 | 8.1 | 8.1 | 11.5 | | |
|   Carbonyl, Wt. Per Cent $(CH_3)_2CO$ | | 1.6 | 0.70 | 0.70 | 0.80 | | |
|   Acids, Wt. Per Cent $CH_3COOH$ | | 0.1 | 0.09 | 0.09 | 0.30 | | |

[1] Based on recovered liquid product.
[2] Calculated as bromine number based on olefin type determination by infrared absorption, uncorrected for oxygenated compound interference.

| | | | | |
|---|---|---|---|---|
| Temperature, °F | 600 | 575 | 600 | 625 |
| Pressure, p. s. i. g. | 150 | 150 | 150 | |
| Feed Rate, V./V./Hr | 200 | 200 | 200 | |
| $H_2/CO$ Ratio (Charge) | 0.878 | 0.904–0.957 | 0.951 | |
| Hours on Stream | 1520–1544 | 1544–1640 | 1640–1712 | 1712–1736 |
| CO Conversion, Mol Per Cent | 84.3 | 47.9–74.4 | 47.7 | |
| $H_2+CO$ Conversion, Mol Per Cent | 70.8 | 41.0–63.8 | 39.7 | |
| Output Yields, cc./M³ of $H_2+CO$ Cons.: | | | | |
| $C_4$+Hydrocarbon | 191 | 130–205 | 163 | |
| Water | 49 | 18–37 | 36 | |
| Hydrocarbon Test Data:[1] | | | | |
| Specific Gravity | | | | |
| Bromine Number | | | | |
| Alpha Olefin [2] | | | | |
| Beta Olefin [2] | | | | |
| Alpha/Beta Olefin Ratio | | | | |
| Alcohol, Wt. Per Cent $C_5H_{11}OH$ | | | | |
| Carbonyl, Wt. Per Cent $(C_2H_5)_2CO$ | | | | |
| Acid, Wt. Per Cent $C_4H_9COOH$ | | | | |
| Water Test Data: | | | | |
| Alcohol, Wt. Per Cent $C_2H_5OH$ | | | | |
| Carbonyl, Wt. Per Cent $(CH_3)_2CO$ | | | | |
| Acids, Wt. Per Cent $CH_3COOH$ | | | | |

[1] Based on recovered liquid product.
[2] Calculated as bromine number based on olefin type determination by infrared absorption, uncorrected for oxygenated compound interference.

It will be apparent from the foregoing data that the present invention allowed operation for an appreciable length of time while producing substantial quantities of hydrocarbons having a high content of alpha olefins and water containing oxygenated hydrocarbons which was rich in valuable oxygenated material.

It is important that a high content of alpha olefins be produced in the synthesis operation since these olefinic hydrocarbons lend themselves to polymerization for production of polymers having valuable lubricating qualities. The beta olefins on polymerization give polymers much less valuable as lubricants. In fact the polymers produced from beta olefins have characteristics which make them unsuitable for use as lubricating oils.

Although specific examples illustrating the practice of the present invention have been given, these examples are for illustrative purposes only and are not intended to limit the scope of the invention. It is to be understood that the present invention is directed to a method for obtaining hydrocarbons and oxygenated organic compounds involving contacting a mixture of CO and $H_2$ at suitable temperatures and pressures with a catalyst which comprises before reduction a major portion of iron oxide, such as ferroferric oxide, gamma or alpha iron oxide crystals, and a minor portion of alkali metal ferrate. It will be apparent to a worker skilled in the art that while specific examples of preferred temperature and pressure ranges for conducting the operation have been given, other conditions may at times be desirable and may be employed without departing from the scope of the invention.

The invention has been illustrated by specific examples wherein the catalyst mass comprises iron oxide and potassium ferrate. It is within the spirit and scope of the invention that the ferrates of other alkali metals besides potassium may be employed; specifically, sodium ferrate may be used as one component of the catalyst and, also, lithium ferrate may be employed. The latter may be less desirable to use than the sodium and potassium ferrates in view of its more expensive nature. It will usually be desirable, therefore, that potassium or sodium ferrate will be the minor component of the catalyst and iron oxide the major component.

The nature and objects of the present invention having been fully described and illustrated, what I wish to claim as new and useful and to secure by Letters Patent is:

1. A process for producing hydrocarbons and oxygenated organic compounds comprising the step of contacting a gaseous mixture of carbon monoxide and hydrogen at a superatmospheric temperature in the range between 450° and 675° F. and at a pressure no greater than 500 pounds per square inch with a catalyst comprising a substantial portion of reduced iron oxide and alkali metal ferrate to form a product comprising substantial amounts of hydrocarbons and oxygenated organic compounds.

2. A process for producing hydrocarbons and oxygenated organic compounds including the step of contacting a gaseous mixture of carbon monoxide and hydrogen with a catalyst comprising a major portion of reduced iron oxide and alkali metal ferrate at a temperature in the range between 450° and 675° F. and at a pressure no greater than 500 pounds per square inch to form a product comprising a substantial amount of hydrocarbons and oxygenated organic compounds.

3. A method for producing hydrocarbons and oxygenated organic compounds including the step of contacting a gaseous mixture of carbon monoxide and hydrogen under superatmospheric temperature in the range between 450° and 675° F. and at a pressure no greater than 500 pounds per square inch with a catalyst prepared by reducing a mass comprising a major portion of iron oxide and a minor portion of alkali metal ferrate to produce a substantial amount of hydrocarbons and oxygenated organic compounds.

4. A method for producing hydrocarbons and oxygenated organic compounds including the step of contacting a gaseous mixture of carbon monoxide and hydrogen at superatmospheric temperature and at a pressure no greater than 500 pounds per square inch with a catalyst prepared by the reduction of a mass comprising a major portion of iron oxide and a minor portion of alkali metal ferrate to obtain a substantial amount of hydrocarbon and oxygenated hydrocarbon product.

5. A process for producing hydrocarbons and oxygenated hydrocarbons including the steps of passing a gaseous mixture of carbon monoxide and hydrogen at a temperature within the range of 450° to 675° F. and a pressure in the range of 100 to 500 pounds per square inch gauge over a catalyst prepared by the reduction of a mixture comprising a major portion of iron oxide and a minor portion of alkali metal ferrate to produce a substantial amount of hydrocarbons and oxygenated hydrocarbons, removing product from contact with the catalyst and recovering hydrocarbons and oxygenated hydrocarbons herefrom.

6. A process for producing hydrocarbons including the steps of passing a gaseous mixture of carbon monoxide and hydrogen at a temperature within the range of 450° to 675° F. and a pressure in the range of 100 to 500 pounds per square inch gauge over a catalyst mass prepared by the reduction of a mixture comprising a major portion of iron oxide and a minor portion of alkali metal ferrate to obtain a substantial amount of hydrocarbon product, removing product from contact with the catalyst, and recovering hydrocarbons and oxygenated hydrocarbons therefrom.

7. A process in accordance with claim 6 in which the iron oxide is ferro-ferric oxide.

8. A process in accordance with claim 6 in which the iron oxide is alpha iron oxide.

9. A process in accordance with claim 6 in which the iron oxide is gamma iron oxide.

10. A process in accordance with claim 6 in which the alkali metal ferrate is potassium ferrate and is employed in an amount between 0.2 to 20% calculated on the basis of the iron oxide present in the catalyst mass.

11. A process in accordance with claim 1 in which the alkali metal ferrate is potassium ferrate.

12. A process in accordance with claim 2 in which the alkali metal ferrate is potassium ferrate.

13. A process in accordance with claim 3 in which the alkali metal ferrate is potassium ferrate.

14. A process in accordance with claim 4 in which the alkali metal ferrate is potassium ferrate.

15. A process in accordance with claim 5 in which the alkali metal ferrate is potassium ferrate.

MAX A. MOSESMAN.

REFERENCES CITED

The following references are of record in the file of this patent:

UNITED STATES PATENTS

| Number | Name | Date |
|---|---|---|
| 1,801,382 | Wietzel et al. | Apr. 21, 1931 |
| 1,996,101 | Dreyfus | Apr. 2, 1935 |
| 2,248,099 | Linkh et al. | July 8, 1941 |
| 2,417,164 | Huber, Jr. | Mar. 11, 1947 |
| 2,438,584 | Stewart | Mar. 30, 1948 |

OTHER REFERENCES

Le Clerc: "Comptes Rendus," vol. 207 (1938) pages 1099–1101.

Mellor: "Comprehensive Treatise on Inorganic and Theoretical Chemistry," vol. 13, pages 929 to 931, Longmans, Green & Co., 1934.